3,431,821
PORTABLE WOODRUFF KEYWAY CUTTER
William Hugh McDonald, Fargo, N. Dak.
(434 Covert Court, P.O. Box 41, Ballwin, Mo. 63011)
Filed June 1, 1967, Ser. No. 643,813
U.S. Cl. 90—12
Int. Cl. B23c 1/20, 3/28
10 Claims

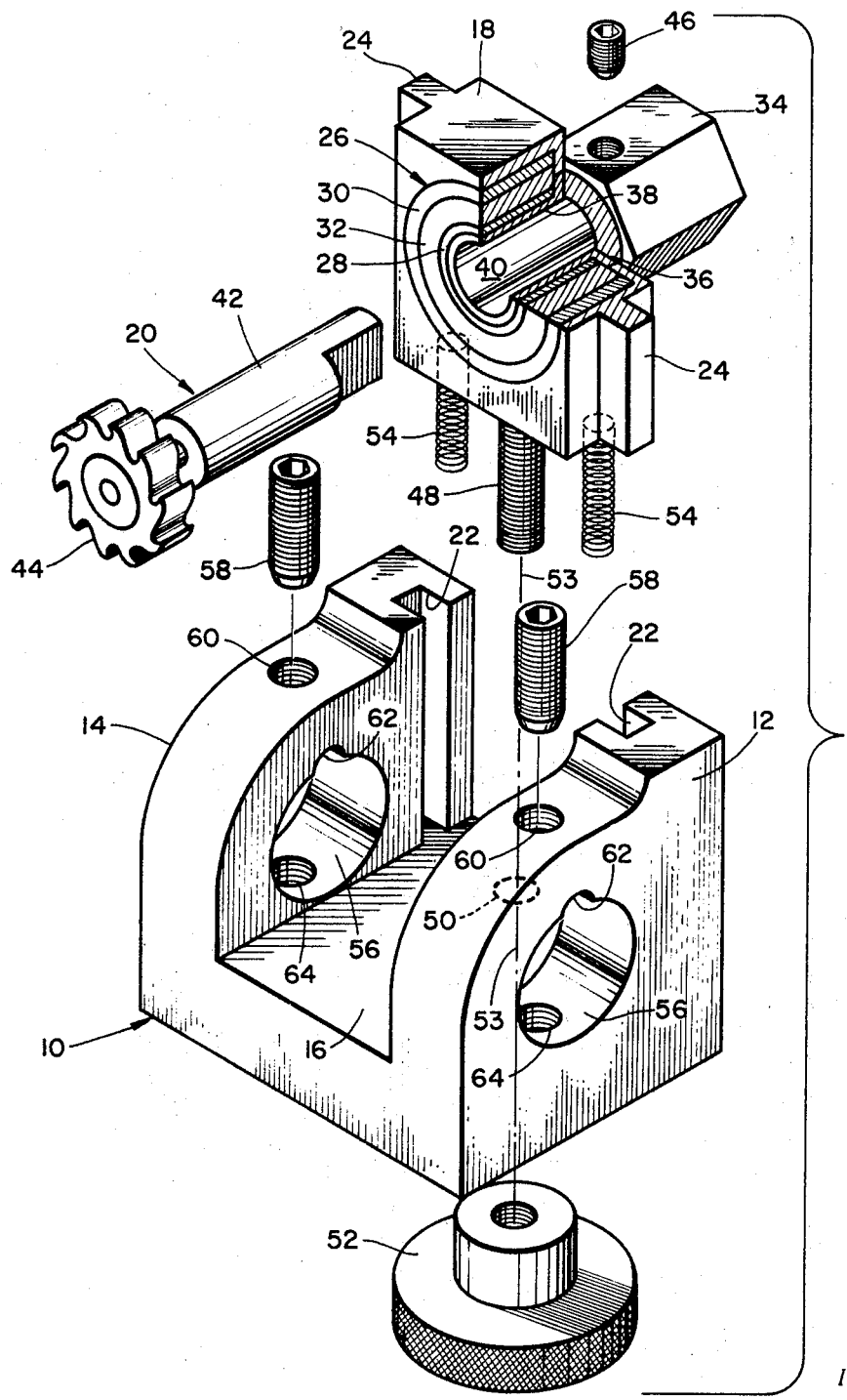

ABSTRACT OF THE DISCLOSURE

A toothed cutter disc or wheel is rotatably carried on a slidable block guided for reciprocal movement by a U-shaped support. The support is provided with axially aligned mounting holes to accommodate the shaft that is to have cut therein a new Woodruff keyway. The mounting holes are configured so as to receive either large or small diameter shafts. Normally, the block and cutter disc or wheel are spring biased in a direction away from the shaft. However, a feed screw has one end threadedly anchored in the block and its other end projecting through the support; a knurled nut, when manually tightened, causes the biasing action of the springs to be overcome and the cutter element to thereby cut the desired new keyway.

Summary of invention

The primary purpose of my portable Woodruff keyway cutter is to enable the operator to cut new keyways at different locations on shafts having the original keyway damaged and still mounted on machine without disassembly of same. The tool is also readily adaptable for new construction. The portability of this tool makes it possible for the operator to make field repair without costly disassembly of component parts.

Description of drawing

The single figure illustrating my invention is an exploded perspective view, certain of the parts being separated from each other in order to show to better advantage their specific construction and portions of certain parts being removed to also illustrate more clearly their particular construction.

Detailed description

The basic structure is a casting in the form of a U-shaped base or support unit 10 comprising spaced end panels 12, 14 and an intermediate connecting panel 16, the unit 10 being designed in such a manner that it may be mounted and operated in any position as will hereinafter become apparent. A sliding block 18 that rotatably carries a cutter mechanism 20 is of cold-roll steel. The basic casting or support 10 is machined to create an accurate guide for the sliding block 18, being formed with grooves 22 in the panels 12 and 14 for the reception of ribs 24 integral with the block 18. In this way, the block 18 is guided in a reciprocal path toward and away from the connecting panel 16. The sliding block 18 is machined to retain a double-roll ball bearing 26 having inner and outer races 28 and 30, respectively. For the sake of drafting simplicity, the cage for the ball bearings has been depicted as a sleeve or bushing 32. The double-roll ball bearing construction, it will be explained, affords more stability as well as reduces friction for the Woodruff keyway cutter mechanism 20. A section of ⅞ inch hexagon steel rod 34 is machined with a collar 36 and cylindrical portion 38 to press into the inner race 28 or bore of the double-roll ball bearing 26. The internal diameter of the hexagon rod 34 is machined with a bore or passage 40 to accommodate the standard Woodruff key cutter mechanism 20, more specifically its shaft 42 to which is attached its toothed cutter disc or wheel 44. The shaft 42 of the cutter mechanism 20 is held in position by a set screw 46. A feed screw 48 is threaded into bottom of the sliding block 18 and extends through a hole 50 in the panel 16 of the main casting or support 10 where a knurled nut 52 is used for manual feed adjustment. It will be obvious that the feed screw 48, the hole 50 and the nut 52 have their centers located on a common line, which has been assigned reference numeral 53. Two coil springs 54 recessed into the sliding block 18, one on either side of the feed screw 48, bias the sliding block 18 in a raised position.

Various sized shafts can be mounted in the basic casting or support 10. The larger shafts rest at the bottom of generally circular mounting holes 56 in the end panels 12, 14 and are secured in position with set screws 58, clamping from the top of the end panels 12, 14 of the casting or support 10 through threaded holes 60 leading downwardly into the mounting holes 56. Smaller shafts down to ⅜ inch diameter can be secured in the top side of mounting holes 56 using the axially aligned small ¼" radius grooves 62 for centering these grooves 62 being formed at the circumference or periphery of the mounting holes 56 and being held in position with screws such as the set screws 58 that extend upwardly through the bottom of the basic casting or support 10 doing so through threaded holes 64 that lead upwardly into the lower segmental portions at the mounting holes 56. This enables adequate travel of the sliding block 18 when using small diameter keyway cutters 44 as used on small diameter shafts. This tool can be manually operated with ratchet and ⅞" socket or, if power is available, by ½" electric drill using adapter and ⅞" socket.

Due to adaptability, portability, minimum set-up time and no need for outside power or special equipment to operate this tool, it is very advantageous for repair in the field as well as shop establishments. All that the user need do is to place the support 10 on the shaft that is to be milled or cut with a new Woodruff keyway, the shaft projecting through both mounting holes 56. If the diameter of the shaft is relatively large, the set screws 58 will be inserted into the holes 60 and advanced until they engage the shaft. If the shaft is quite small in diameter, then the set screws will be threaded into the holes 64 to force the shaft upwardly against the grooves 62. During this procedure the nut 52 will be backed off or retracted on the feed screw 48 so that the block 18 is biased by the springs 54 upwardly or away from the connecting part 16 of the casting or support 10. Of course, the support 10 can be placed at any angle on the shaft where the new keyway is to be cut without having to rotate the shaft. Assuming, though, that the parts are oriented in the position pictured in the drawing, tightening of the nut 52 will pull the block 10 and the cutter mechanism 20 downwardly so that the toothed cutter disc or wheel 44 engages the shaft and rotation of the wheel 44 by means of a ratchet or electric drill connected to the hexagonal rod 34 (along with a continued tightening of the nut 52) will produce the desired new Woodruff keyway.

My portable Woodruff keyway cutter is basically set up with a casting or support 10 that is machined to accommodate a sliding block 18 which incorporates a double-roll ball bearing with a ⅞ inch hexagon shaft 34 pressed inside bearing bore. The I.D. of the hexagon shaft 34 is machined to accommodate standard ½" shaft Woodruff keyway cutter mechanism 20. The mounting holes in the casting 56 are machined in such a manner as to accommodate different sized shafts.

I claim:
1. A Woodruff keyway cutter comprising support means having spaced end panels and an intermediate connecting panel, said end panels being provided with axially aligned mounting holes having a relatively larger radius for the accommodation of a relatively large diameter shaft and being further provided with peripherally disposed axially aligned grooves of a lesser radius for the accommodation of a relatively small diameter shaft, said end panels having inwardly directed threaded holes leading into said mounting holes at locations diametrically opposite the grooves for the reception of clamping screws to effect engagement of the shaft to be cut, a cutter element, and means between said end panels for rotatably mounting said cutter element for advancement and retraction toward the shaft to be cut.

2. A keyway cutter in accordance with claim 1 in which said means for mounting said cutter element includes a block having oppositely directed ribs, said end panels having longitudinal grooves offset from said peripherally disposed grooves and extending in a direction parallel to said peripherally disposed grooves and said threaded holes.

3. A keyway cutter in accordance with claim 2 including means for biasing said block in a direction away from said connecting panel.

4. A Woodruff keyway cutter comprising U-shaped support means including spaced end panels and in intermediate connecting panel, said end panels having axially aligned mounting holes for the accommodation of a shaft to be cut with a keyway, a block, guide means associated with said block and said end panels for slidably receiving the block between said end panels in an offset relationship with respect to said mounting holes, means normally biasing said block away from said connecting panel, and a cutter element rotatably carried on said block.

5. A keyway cutter in accordance with claim 4 including a feed screw anchored in said block, said connecting panel having a hole therein through which said screw projects, and a nut threadedly received on said feed screw whereby advancement of said nut against said connecting panel overcomes the action of the biasing means to pull said block toward said connecting panel with the consequence that said cutter element is moved in a direction toward the shaft to be cut.

6. A keyway cutter in accordance with claim 5 in which said biasing means includes a pair of coil springs having their corresponding ends received in said block at either side of said feed screw and having their opposite ends abutting said connecting panel.

7. A keyway cutter in accordance with claim 6 in which said end panels each have a pair of threaded holes diametrically spaced from each other and leading inwardly to said mounting holes.

8. A keyway cutter in accordance with claim 7 in which said threaded holes extend parallel to said feed screw.

9. A keyway cutter in accordance with claim 8 in which said mounting holes are circular and peripheral portions thereof are formed with axially aligned grooves of lesser radius than the radius of said mounting holes.

10. A keyway cutter in accordance with claim 9 in which said grooves are radially aligned with said threaded holes at locations remote from said connecting panel.

References Cited

UNITED STATES PATENTS

| | | | |
|---|---|---|---|
| 1,045,501 | 11/1912 | Berghausen | 90—12 |
| 2,464,297 | 3/1949 | Ertl | 90—12 |
| 3,079,842 | 3/1963 | Primich | 90—12 |

ANDREW R. JUHASZ, *Primary Examiner.*

G. WEIDENFELD, *Assistant Examiner.*

U.S. Cl. X.R.

90—15